United States Patent [19]

Noguchi

[11] Patent Number: 5,777,788
[45] Date of Patent: Jul. 7, 1998

[54] POLARIZER AND METHOD FOR USING SAME

[75] Inventor: Masato Noguchi, Tokyo, Japan

[73] Assignee: Asahi Kogaku Kogyo Kabushiki Kaisha, Tokyo, Japan

[21] Appl. No.: 612,293

[22] Filed: Mar. 7, 1996

[30] Foreign Application Priority Data

Mar. 9, 1995 [JP] Japan .................................. 7-078201

[51] Int. Cl.$^6$ ...................................................... G02B 5/30
[52] U.S. Cl. ........................... 359/487; 359/495; 359/496; 359/638; 359/834
[58] Field of Search ........................... 359/487, 495, 359/496, 633, 638, 831, 833, 834

[56] References Cited

U.S. PATENT DOCUMENTS 3,463,575  8/1969  Gates, Jr. ................................. 359/487
4,913,529  4/1990  Goldenberg et al. ................... 359/496

OTHER PUBLICATIONS

Japanese Unexamined Patent Publication No. 5-27203.

Japanese Unexamined Patent Publication No. 61-90584.

*Primary Examiner*—Paul M. Dzierzynski
*Assistant Examiner*—Darren E. Schuberg
*Attorney, Agent, or Firm*—Kane, Dalsimer, Sullivan, Kurucz, Levy, Eiselle and Richard, LLP

[57] ABSTRACT

A polarizer having first and second reflecting surfaces which define an angle of 120° therebetween and a beam splitting surface which lies in a bisectional plane of the first and second reflecting surfaces. The first and second reflecting surfaces and the polarization beam splitting surface are arranged to meet at a line which defines an edge of the polarizer.

14 Claims, 7 Drawing Sheets

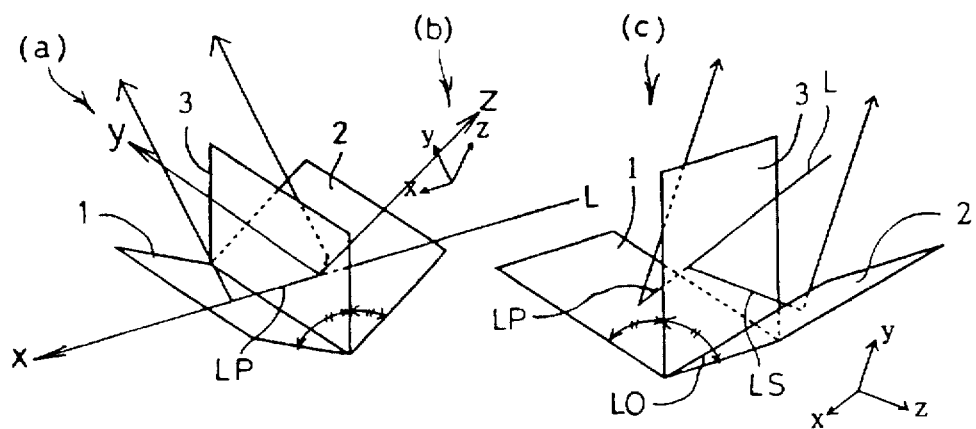
Fig. 1a
Fig. 1b
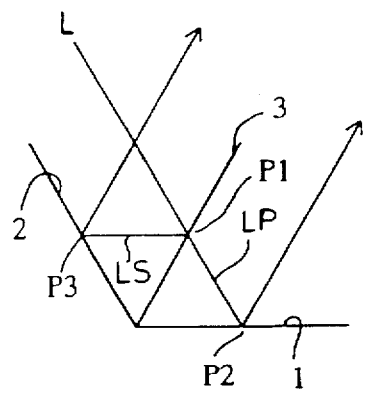
Fig. 2a
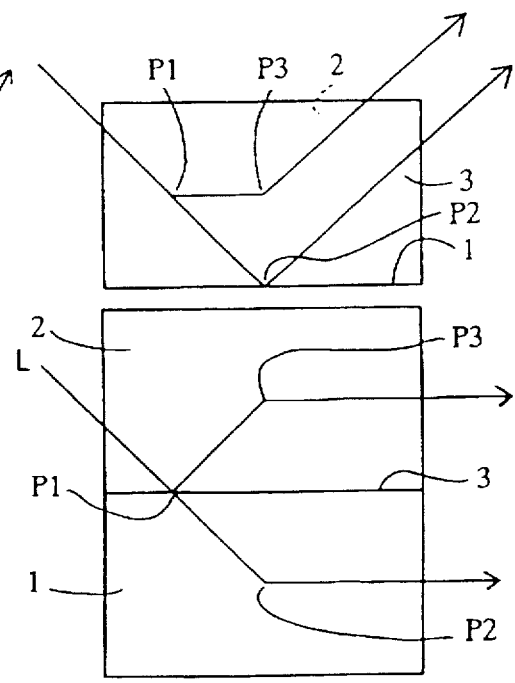
Fig. 2b
Fig. 2c

Fig. 3a
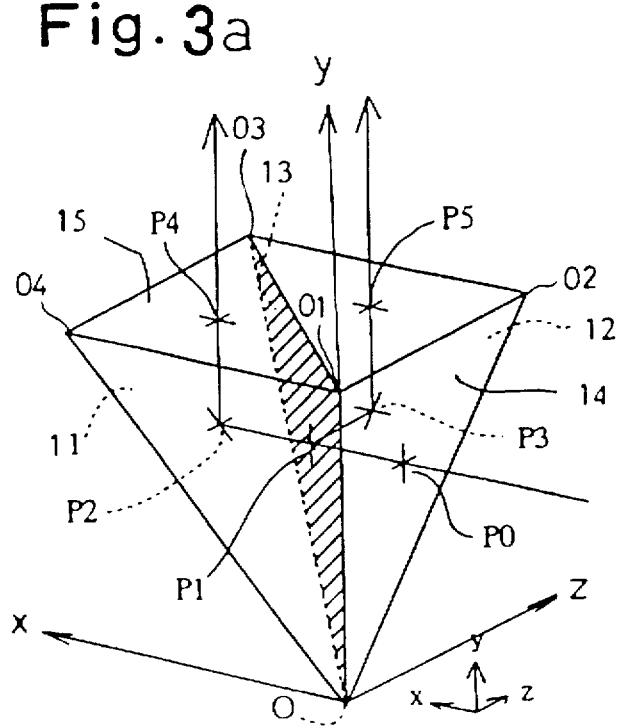
Fig. 3b
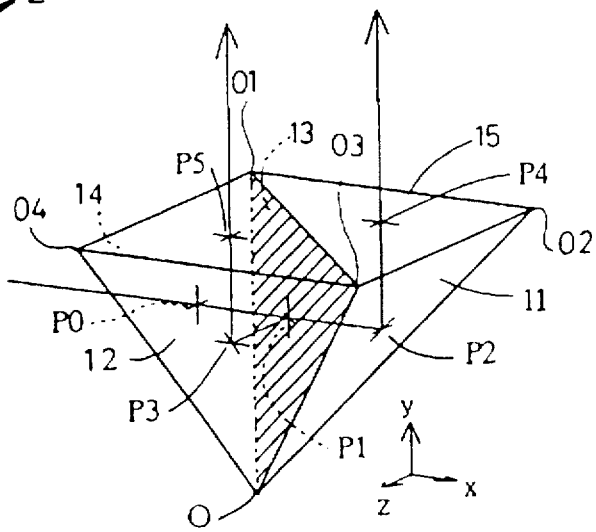
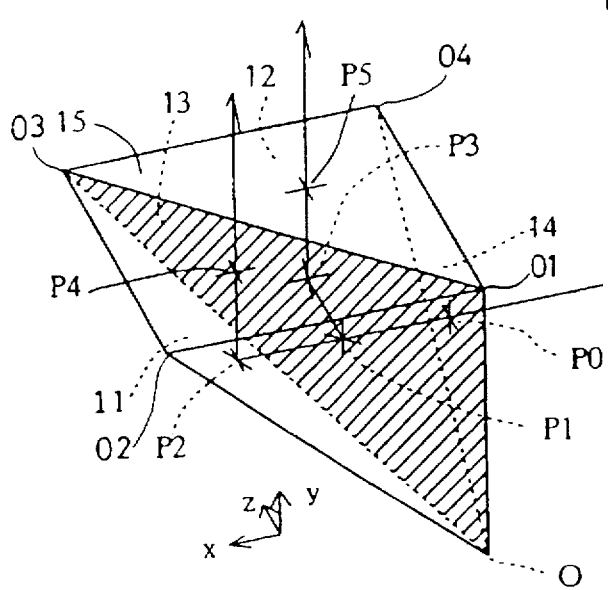
Fig. 3c

POLARIZER AND METHOD FOR USING SAME

BACKGROUND OF THE INVENTION

1. Field of the Invention

The present invention relates to a polarization converting element which can be used, for example, in an optical system for a liquid crystal projector to make rays of light polarized in identical directions.

2. Description of Related Art

In a known liquid crystal projector, light is made incident upon a liquid crystal panel (LC panel) before being projected onto a screen. The LC panel has a matrix arrangement of pixels, so that an object image can be formed due to the state of polarization which varies depending on the voltage applied to each pixel.

The light incident upon the LC panel must be linearly polarized light, having an identical polarization direction. However, if a polarizing plate is used to produce the linearly polarized light, the quantity of light emitted from a light source is reduced by half when it reaches the screen, due to light loss caused by the polarizing plate. Hence, the screen becomes dark. Due to this, a need has been created for a polarizer in which no or little light loss occurs.

For example, Japanese Unexamined Patent Publication No. 61-90584 discloses a polarizer in which light is split into P-polarized light and S-polarized light by a polarization beam splitter PBS. The P-polarized light is directly emitted and the S-polarized light is reflected by a reflecting prism (RP) and transmitted through a ½ wave plate (HP) to make the polarization direction thereof identical to the polarization direction of the P-polarized light.

Also, Japanese Unexamined Patent Publication No. 5-27203 discloses a polarizer in which P-polarized light, split by a polarization beam splitter (PBS), is directly emitted and the S-polarized light is reflected by two reflecting prisms (RP1, RP2) in two dimensional directions to make the polarization direction thereof identical to the polarization direction of the P-polarized light.

However, the polarizers disclosed in JPP '584 and JPP '203 have the following drawbacks. Namely, in the polarizer disclosed in JPP '584, the ½ wave plate is expensive and the sharpness of the object image to be projected is reduced. In general, a ½ wave plate is comprised of a birefringent plane-parallel plate whose thickness is adjusted with reference to a wavelength to appropriately select a phase difference between ordinary light and extraordinary light. Consequently, if, for example, light having a wide wavelength band, such as white light, is used, the phase difference is identical to a ½ wavelength only at a specific wavelength, so that the light to be emitted from the polarizer is linearly polarized light, but the phase difference cannot be identical to a ½ wavelength at wavelengths other than the specific wavelength, thus resulting in elliptically polarized light. If the light incident upon the LC panel is not linearly polarized light, the extinction coefficient becomes small and the sharpness of the object image to be projected is reduced.

In the polarizer disclosed in JPP '203, the polarization directions of the P-polarized light and S-polarized light can be made identical without using the ½ wave plate. However, the spatial distance between the light emitting points of the two bundles of light is increased. Therefore, it is necessary to provide a light combining optical system in order to make the bundles of light incident upon the same LC panel. This results in an increased number of optical elements and a need for an increased accommodation space for the optical system.

SUMMARY OF THE INVENTION

It is an object of the present invention to provide a polarizer in which the spatial distance between two bundles of rays of light emitted therefrom is reduced and no ½ wave plate is needed.

To achieve the object mentioned above, according to the present invention, there is provided a polarizer in which light is incident upon a polarization beam splitting surface to split the light into a light component transmitted therethrough and a light component reflected by the polarization beam splitting surface. Both the light components are reflected by respective reflecting surfaces. First and second reflecting surfaces are provided which define an angle of 120 degrees therebetween and the beam splitting surface lies in a bisectional plane of the first and second reflecting surfaces. The first and second reflecting surfaces and the polarization beam splitting surface are arranged so as to intersect at a line which defines one of the edges of the polarizer. Light parallel to the second reflecting surface is made incident upon the polarization beam splitting surface at an incident angle of 45° with respect thereto.

The polarizer can be comprised of a prism provided with orthogonal light incident and light emission surfaces, with the polarization beam splitting surface being arranged to define an angle of 45° with respect to the light incident surface and to be perpendicular to the light emission surface, the first reflecting surface being arranged to define an angle of 45° with respect to the light incident surface and the light emission surface, and the second reflecting surface being arranged to be perpendicular to the light incident surface and to define an angle of 45° with respect to the light emission surface. Light is made incident upon the light incident surface at right angles.

Preferably, the polarizer is comprised of a first prism and a second prism. The first prism being provided with the light incident surface, the polarization beam splitting surface, the second reflecting surface, and an emission surface portion which defines a part of the light emission surface. The second prism being provided with the polarization beam splitting surface, the first reflecting surface, and an emission surface portion which defines a part of the light emission surface. The first and second prisms being cemented at their respective polarization beam splitting surfaces.

According to another aspect of the present invention, a polarizer is provided comprising a prism having orthogonal light incident and light emission surfaces and a polarization beam splitting surface which defines an angle of 45° with respect to the light incident surface and which is perpendicular to the light emission surface to split the light incident upon the light incident surface into two linearly polarized light components. First and second reflecting surfaces are also provided.

The first reflecting surface defines an angle of 45° with respect to the light incident surface and the light emission surface and internally reflects the light component transmitted through the polarization beam splitting surface toward the light emission surface.

The second reflecting surface is perpendicular to the light incident surface and defines an angle of 45° with respect to the light emission surface to internally reflect the light component reflected by the polarization beam splitting surface toward the light emission surface.

It is preferred that the first and second reflecting surfaces and the polarization beam splitting surface are arranged to meet at a line which defines an edge of the prism, and that light is made incident upon the light incident surface at right angles.

The prism can be in the form of a pyramid having a square bottom surface, whose apex is located on a line normal to the bottom surface at one of the four corner points thereof. The height of the pyramid being identical to the length of one side of the square, and wherein one of the side surfaces of the pyramid, which are in the form of right-angled isosceles triangles, defines the light incident surface, and the square bottom surface defines the light emission surface.

It is possible to cut away an unnecessary portion of the prism through which no light passes, on the assumption that light is made incident upon the light incident surface at right angles.

It is also possible to provide deflecting prisms adhered to the light emission surface of the polarizer. Additionally, two polarizers can be adhered at their respective second reflecting surfaces to the prism.

The present disclosure relates to subject matter contained in Japanese Patent Application No. 07-78201 (filed on Mar. 9, 1995) which is expressly incorporated herein by reference in its entirety.

BRIEF DESCRIPTION OF THE DRAWINGS

The invention will be described below in detail with reference to the accompanying drawings, in which:

FIGS. 1a and 1b are perspective views of a basic structure of a polarizer, shown in different directions, according to an aspect of the present invention;

FIGS. 2a, 2b and 2c are plan views of the polarizer shown in FIGS. 1a and 1b;

FIGS. 3a, 3b and 3c are perspective views of a first embodiment of a polarizer of the present invention, shown in different directions;

DESCRIPTION OF THE PREFERRED EMBODIMENTS

Figure 4:
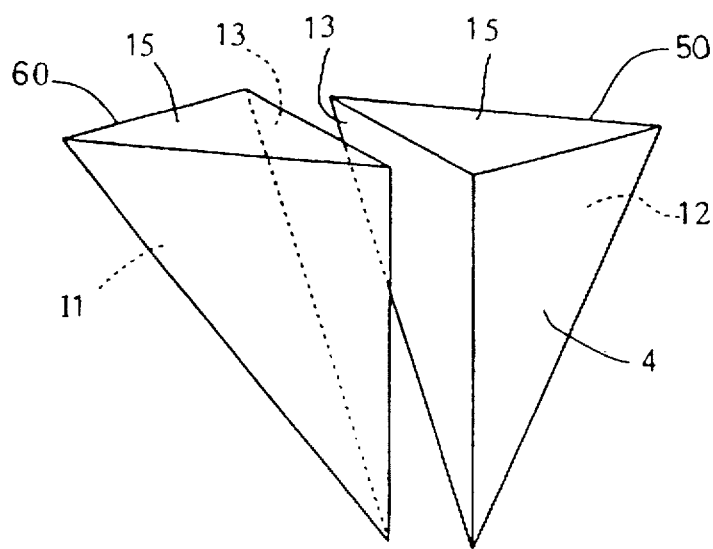
FIG. 4 is an exploded perspective view of a prism which constitutes a polarizer according to the first embodiment of the present invention.

FIGS. 1a and 1b are perspective views of a polarizer according to an aspect of the present invention, showing surfaces thereof in different directions. FIGS. 2a through 2c are plan views of the polarizer shown in FIGS. 1a and 1b, as viewed from different directions.

The polarizer according to the present invention is comprised of a first reflecting surface 1, a second reflecting surface 2, and a polarization beam splitting surface (PBS surface) 3 which lies in a bisectional plane of the first and second reflecting surfaces 1 and 2. An angle of 120 degrees is formed between the first reflecting surface 1 and the second reflecting surface 2. The reflecting surfaces 1 and 2 and the PBS surface 3 meet at a line, LO, which defines an edge (edge line) of the polarizer. To produce linearly polarized light having an identical polarization state (direction) from light whose polarization state is random, it is necessary to make light incident upon the PBS surface 3, from the side of the second reflecting surface 2, at an incident angle of 45 degrees with respect thereto and in parallel with the second reflecting surface 2.

It should be noted that the term "angle defined between surfaces" refers to an angle defined between the surfaces in a plane in which normal lines of the respective surfaces are included. The "incident angle" of light upon a surface refers to an angle defined between the incident light and a line normal to the surface within an incident plane which includes the normal line and the incident light.

The P-polarized light component of the light L incident upon a point P1 (FIG. 2) of the PBS surface 3 at an incident angle of 45 degrees oscillates in parallel with the incident plane including the light L and the line normal to the PBS surface 3 and is transmitted through the PBS surface 3. The S-polarized light component which oscillates in a direction perpendicular to the incident plane is reflected by the PBS surface 3 at right angles.

The angle defined between the first reflecting surface 1 and the PBS surface 3 is 60 degrees. The incident light is incident upon the PBS surface 3 at an incident angle of 45 degrees and in parallel with the second reflecting surface 2 which defines an angle of 120 degrees together with the first reflecting surface 1. Consequently, the incident angle of the P-polarized light component LP with respect to the first reflecting surface 1 is 45 degrees. Hence, the P-polarized light component LP is reflected at right angles by the first reflecting surface 1 (at point P2) and emitted therefrom at right angles with respect to the light incident upon the PBS surface 3.

The S-polarized light component LS travels in an incident plane including the incident light incident upon the PBS surface 3, toward the second reflecting surface 2. Since the incident angle of the S-polarized light component LS with respect to the second reflecting surface 2 is 45 degrees, the S-polarized light component LS is reflected at right angles by the second reflecting surface 2 (at point P3) and is emitted therefrom perpendicularly to the incident plane of the PBS surface 3. Thus, the S-polarized light component LS is emitted in the same direction as the P-polarized light component LP.

It is assumed here that the direction of the incident light L is an axis x, and orthogonal axes y and z are perpendicular to the axis x. A plane defined by the axes x and z is parallel with an incident plane of the light incident on the PBS surface 3. The axis y extends in parallel with the emitted light.

Referring to the coordinates of the axes x-y-z, the P-polarized light component and the S-polarized light component are defined to be an oscillation component in the z-axis direction and an oscillation component in the y-axis direction, respectively. The P-polarized light component which oscillates in the z-axis direction does not change in the oscillation direction when the light is reflected by the first reflecting surface 1. Hence, the emission light oscillates in the axis z. On the other hand, when the S-polarized light component LS which oscillates in the y-axis direction is reflected by the second reflecting surface 2, the oscillation direction thereof is changed to the z-axis direction, and the emission light oscillates in the z-axis direction.

Consequently, the oscillation directions of the rays of light emitted from the first and second reflecting surfaces 1 and 2 are both identical to the z-axis without using a ½ wave plate, unlike the prior art in which a ½ wave plate is needed. Moreover, since the two bundles of rays of light are emitted in parallel, the spatial distance between the two bundles of rays of light can be reduced, in comparison with the prior art in which it is necessary to provide an optical system to combine the two bundles of rays of light spaced at a large distance. In the present invention, no light combining optical system is needed.

Two embodiments of a polarizer applied to a prism will be discussed below.

FIGS. 3a through 3c are perspective views of a first embodiment of a prism to which a polarizer of the present invention is applied, shown in different directions.

The polarizer is basically in the form of a pyramid having a square bottom (or top) surface. The apex of the pyramid is located on a line normal to the bottom surface (square surface) at one of the four corner points (as seen in FIG. 3a). The height of the pyramid is identical to the length of one side of the square bottom. In the FIGS. 3a through 3c, the coordinates (x-y-z) of the apexes O1, O2, O3 and O4 (four corner points of the square) are represented by (0,k,0), (0,k,k), (k,k,k) and (k,k,0), respectively, wherein k is a constant, 0 is the origin located at the apex of the pyramid and wherein the direction of the incident light is identical to the axis x.

One of the side surfaces of the pyramid (which is a right-angled isosceles triangle) is an incident side surface 14, and the square bottom surface perpendicular to the incident side surface 14 is an emission side surface 15. A PBS surface 13, which is hatched in FIGS. 3a through 3c, is located to define angles of 45 degrees and 90 degrees with respect to the incident side surface 14 and the emission side surface 15, respectively. Namely, the PBS surface 13 includes the apexes O, O1 and O3.

A first reflecting surface 11 defines 60 degrees with respect to the PBS surface 13, and 45 degrees with respect to the incident side surface 14 and the emission side surface 15. A second reflecting surface 12 defines 120 degrees and 45 degrees with respect to the first reflecting surface 11 and the emission side surface 15, respectively. The second reflecting surface 12 is perpendicular to the incident side surface 14 (FIG. 3c). The first and second reflecting surfaces 11 and 12 and the PBS surface 13 intersect at one line which defines one of the edge lines of the polarizer. Each surface is represented, using coordinates, as follows.

First reflecting surface x=y;
Second reflecting surface y=z;
PBS surface x=z;
Incident side surface x=0;
Emission side surface y=k (k=constant)

The "incident side surface" refers to an existing first surface of the prism and can be definitely distinguished from the imaginary incident plane used in the foregoing description of the polarization direction.

The polarizer, in the form of a prism as constructed above, can be formed by cementing first and second symmetrical prism elements 50 and 60, each having four surfaces, as shown in FIG. 4. The first prism element 50 includes an incident side surface 14, a PBS surface 13, a second reflecting surface 12, and an emission side surface 15 which forms a part of the emission side surface of the polarizer. The second prism element 60 includes a PBS surface 13, a first reflecting surface 11 and an emission side surface 15 which forms a part of the emission side surface of the polarizer. The first and second prism elements 50 and 60 are adhered at their respective PBS surfaces 13 to obtain the polarizer according to the first embodiment.

When the polarizer according to the first embodiment is used, light is made incident upon the incident side surface 14 at right angles, as shown in FIGS. 3a through 3c. Consequently, the light is incident upon the PBS surface 13 at an incident angle of 45 degrees and in parallel with the second reflecting surface 12. The light incident upon the incident point P0 of the incident side surface 14 is incident upon the PBS surface 13 at the point P1. The light transmitted through the PBS surface 13 is reflected by the first reflecting surface 11 at the point P2 and the light reflected by the PBS surface 13 is reflected by the second reflecting surface 12 at the point P3. The rays of light reflected by the first and second reflecting surfaces 11 and 12 are emitted from the emission side surface 15 at the points P4 and P5, respectively. Since these reflected rays of light are perpendicular to the rays of light incident upon the PBS surface 13, and the emission side surface 15 lies in parallel with the rays of light incident upon the PBS surface 13, the two bundles of rays of light emitted from the emission side surface 15 are perpendicular to the latter.

The P-polarized light component transmitted through the PBS surface 13 oscillates in the z-axis direction and does not change in the polarization direction when reflected by the first reflecting surface, and hence, the light emitted from the emission side surface 15 oscillates in the z-axis direction. On the other hand, the oscillation direction of the S-polarized light component which oscillates in the y-axis direction is changed to the z-axis direction when reflected by the second reflecting surface 12. Thus, the light emitted from the emission side surface 15 oscillates in the z-axis direction. As a result, the two bundles of rays of light whose polarization direction is identical to the z-axis direction are emitted from the emission side surface 15 in the y-axis direction perpendicular to the direction incident light.

Figure 5:
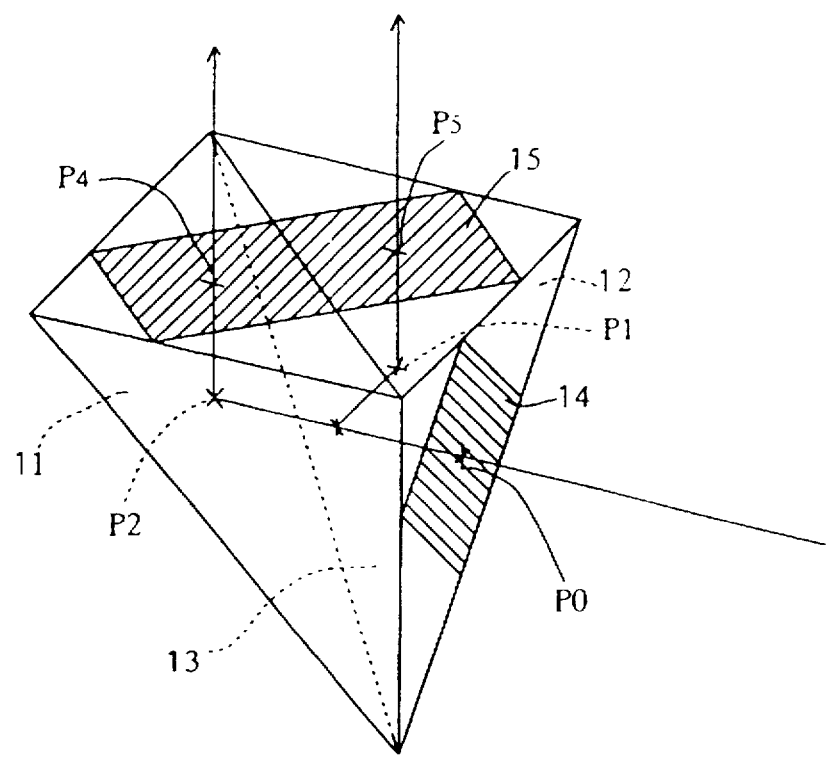
FIG. 5 is a perspective view of the polarizer shown in FIGS. 3a through 3c showing a light emitting area and a light incident area.

FIG. 5 shows a light incident area and a light emission area in a polarizer according to the first embodiment. The light incident upon the hatched (substantially) square area of the incident side surface 14 is emitted from the hatched rectangular area of the emission side surface 15. The hatched rectangular area is twice the size of the hatched square area.

In the case that the polarizer is used in an optical system for an LC projector, the light utilization efficiency can be increased by making the light incident upon the substantially square incident area, as shown in FIG. 5, since in general, the screen (image projecting surface) of the projector is rectangular. In particular, if an image is to be projected onto an image surface whose ratio between the major side and minor side is approximately 1:2 as in a high definition TV, the above-mentioned arrangement can be advantageously employed.

If the ratio of the image surface (image to be projected) between the major side and the minor side is approximately 1:1, it is possible to make the light incident upon a rectangular incident area of the incident side surface in order to emit the light from a square emission area of the emission side surface. In any event, the ratio of the image to be projected, between the major side and the minor side can be adjusted by optionally selecting the ratio of the incident area between the major side and the minor side.

Figure 6:
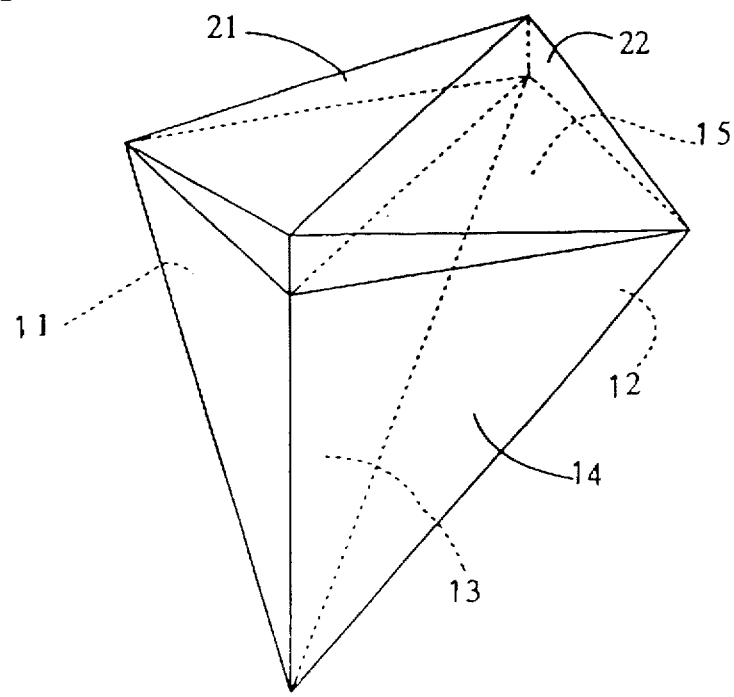
FIG. 6 is a perspective view of the polarizer shown in FIGS. 3a through 3c, having a wedge-shaped prism cemented to the light emitting surface of the polarizer.

It is also possible to provide deflecting prisms 21 and 22 adhered to the emission side surface 15 of the polarizer according to the first embodiment of the present invention in order to intersect the bundles of rays of light emitted from the emission side surface 15, as shown in FIG. 6. With this arrangement, a variation of the intensity of the light at the boundary portion between the two bundles of light reflected by the first and second reflecting surfaces can be restricted.

Figure 7:
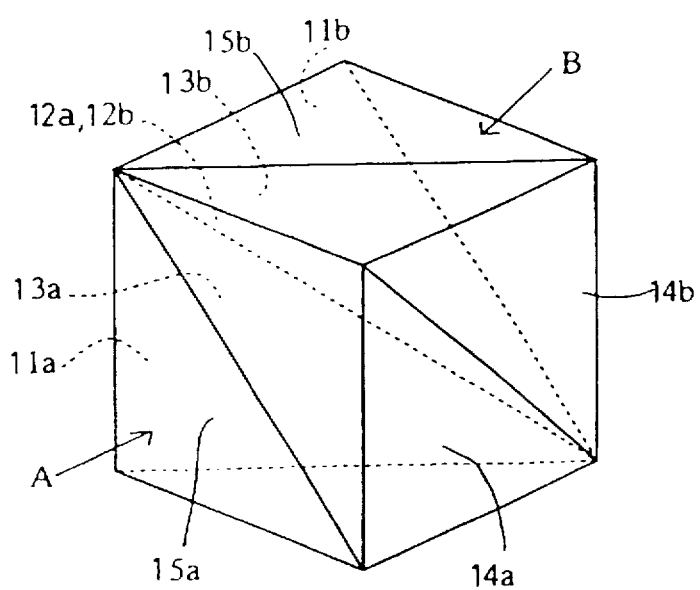
FIG. 7 is a perspective view of a polarizer unit comprised of two cemented polarizers shown in FIGS. 3a through 3c.

It is possible to combine two polarizers A and B according to the first embodiment of the present invention to form a compound prism (polarizer unit or assembly), as shown in FIG. 7. The polarizers are adhered at their second reflecting surfaces 12a and 12b. The rays of light incident upon the incident side surfaces 14a and 14b are split by the respective PBS surface 13a and 13b and are then reflected by the first and second reflecting surfaces 11a, 11b and 12a, 12b, and are emitted from the emission side surfaces 15a and 15b, respectively. The rays of light emitted from the emission side surfaces 15a and 15b have the identical polarization direction. Moreover, if one of the bundles of rays emitted from the emission side surfaces is reflected by a mirror to deflect the light in the same direction as the other bundle of rays to thereby make an identical polarization direction of all the bundles of rays.

Figure 11:
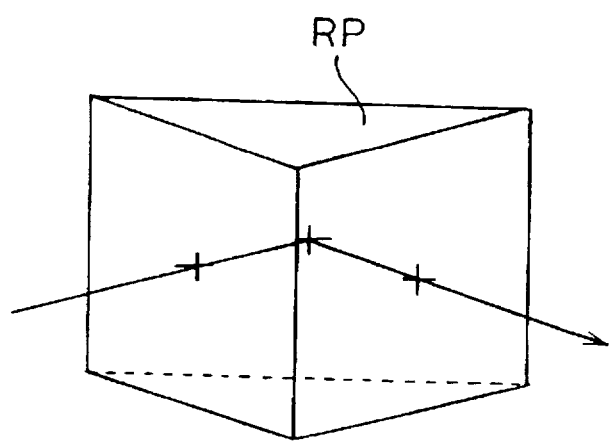

In the arrangement illustrated in FIG. 7, when the light is incident upon the square incident area defined by the incident side surfaces 14a and 14b, the rays of light having the identical polarization direction can be emitted from the square emission area defined by the emission side surfaces 15a and 15b. If the reflecting prism RP shown in FIG. 11 is attached to one of the emission side surfaces of the compound prism, when the light is made incident upon the incident area of (1×1), the rays of light having an identical polarization direction are emitted from the emission area of (2×(1×1)). The size of the compound prism with respect to the incident area is smaller than the total size of the separate prisms A and B.

Figure 8A:
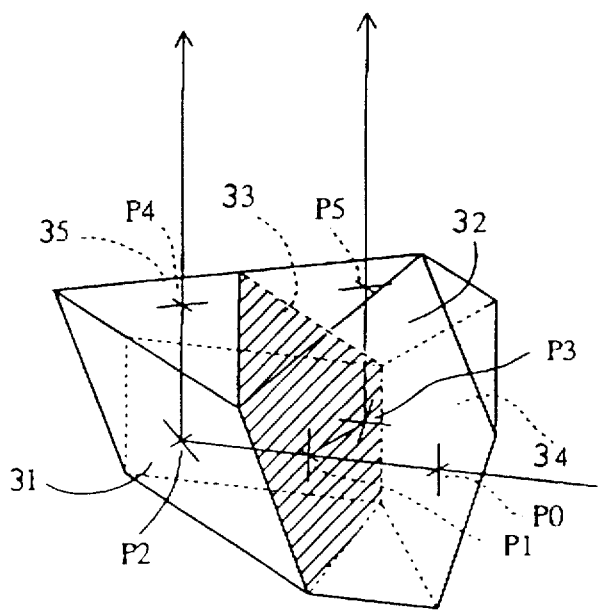
FIGS. 8a, 8b and 8c are perspective views of a second embodiment of a polarizer according to the present invention, shown in different directions.
Figure 8B:
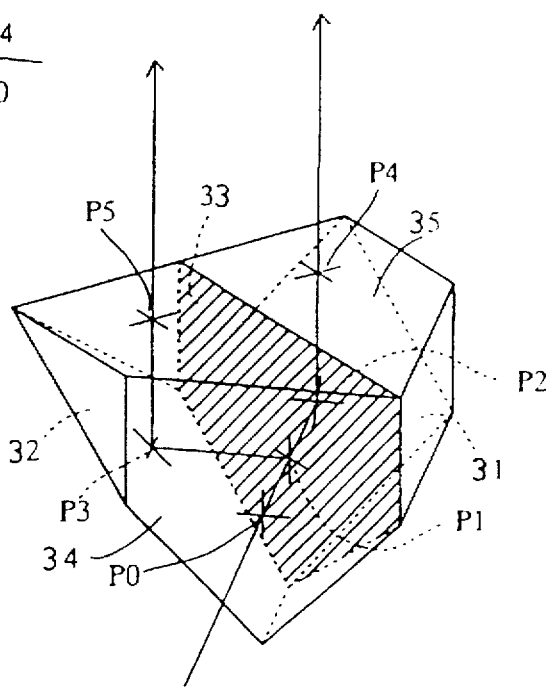
Figure 8C:
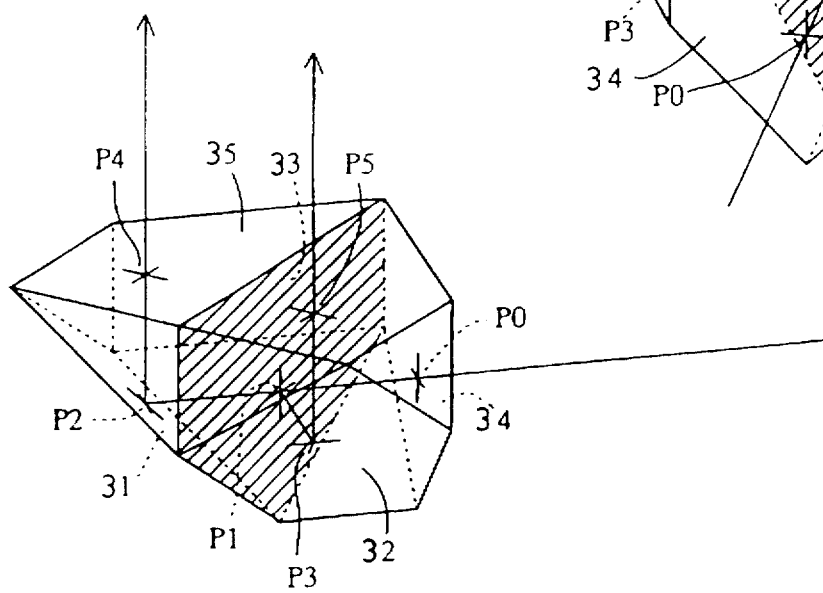
Figure 9:
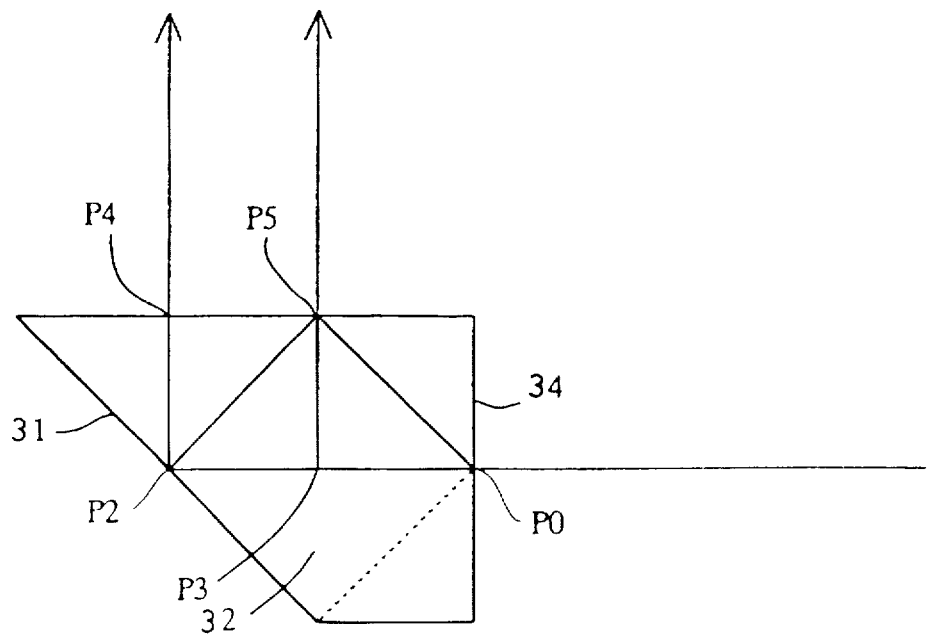
FIG. 9 is a plan view of the polarizer shown in FIGS. 8a through 8c.

FIGS. 8a through 8c show perspective views of a polarizer according to a second embodiment of the present invention, in different directions. FIG. 9 shows a side elevational view of the polarizer shown in FIGS. 8a through 8c. The polarizer in this embodiment is comprised of a prism made of a nine-sided solid body, which is formed by cutting and removing the unnecessary portion of the polarizer of the first embodiment through which no light incident upon the incident side surface as shown in FIG. 5 passes. The positional relationship of the first and second reflecting surfaces 31, 32, the PBS surface 33, the incident side surface 34, and the emission side surface 35 in the second embodiment is the same as that of the polarizer according to the first embodiment.

The light incident upon the pentagonal incident side surface 34 at the point P0 is made incident upon the PBS surface 33 at the point P1. The P-polarized light component transmitted through the PBS surface 33 is reflected by the square first reflecting surface 31 at the point P2. The S-polarized light component reflected by the PBS surface 33 is reflected by the pentagonal second reflecting surface 32 at the point P3. The S-polarized light component and the P-polarized light component are emitted from the pentagonal emission surface 35 at right angles. The polarization directions of the S-polarized light component and the P-polarized light component are identical. Namely, no ½ wave plate is needed to obtain the identical polarization direction of the light emitted from the polarizer, similar to the first embodiment. Furthermore, the rays (bundles) of light emitted from the polarizer are close to each other.

Figure 10:
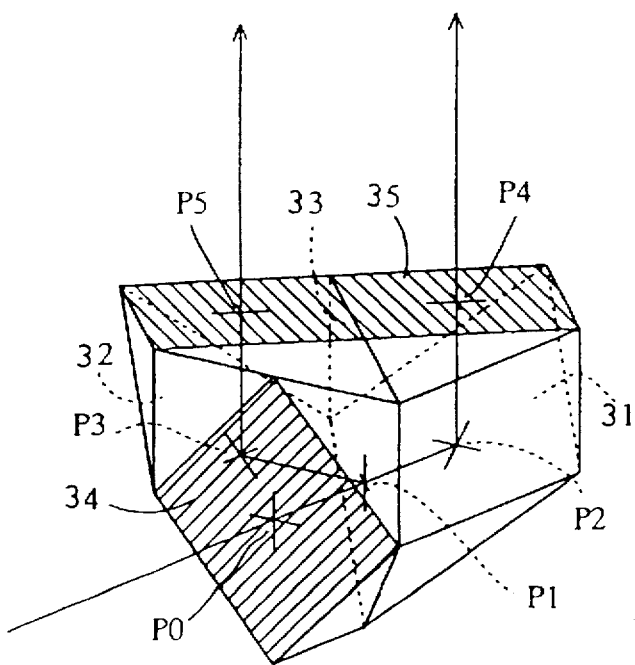
FIG. 10 is a perspective view of the polarizer shown in FIGS. 8a through 8c to show a light emitting area and a light incident area; and, FIG. 11 is a perspective view of a reflecting prism.

FIG. 10 show a perspective view of a light incident area and a light emission area in the polarizer according to the second embodiment. Similar to the first embodiment, the light incident upon the hatched (substantially) square area of the incident side surface 34 is emitted from the hatched rectangular emission area of the emission side surface 35.

With the arrangement according to the second embodiment, since the unnecessary portion of the prism through which no light passes is removed, the size of the prism can be reduced.

If the incident area is (1×1), the size of the prism is $(2\times(2\times 2^{1/2}))$, which is larger than the size $(2\times(1\times 1))$ of the compound prism shown in FIG. 7 having the reflecting prism RP attached thereto.

As can be understood from the above discussion, according to the present invention, not only can the polarization directions of two bundles of light rays emitted from the polarizer be made identical without using a ½ wave plate but also the spatial distance between the two bundles of light rays can be reduced.

Consequently, if a polarizer according to the present invention is applied to an optical system of an LC projector, the extinction coefficient is higher than that in an optical system using a ½ wave plate. Thus, the sharpness of the image to be projected can be increased. Moreover, owing to an absence of an optical system to combine the rays of light spaced at a relatively large distance, the optical system can be simplified in the present invention.

What is claimed is:

1. A polarizer comprising:
   first and second reflecting surfaces which define an angle of 120° therebetween; and
   a polarization beam splitting surface which lies in a bisectional plane of the first and second reflecting surfaces;
   wherein said first and second reflecting surfaces and said polarization beam splitting surface are positioned such that light parallel to said second reflecting surface is incident on said polarization beam splitting surface at an angle of 45°.

2. A polarizer according to claim 1, wherein said first and second reflecting surfaces and said polarization beam splitting surface are arranged so as to meet at a line which defines an edge of the polarizer.

3. A polarizer according to claim 1, wherein said polarizer is comprised of a prism.

4. A polarizer according to claim 3, wherein the prism is provided with orthogonal light incident and light emission surfaces, said polarization beam splitting surface being arranged to define an angle of 45° with respect to the light incident surface and to be perpendicular to the light emission surface, said first reflecting surface being arranged to define an angle of 45° with respect to the light incident surface and the light emission surface, and said second reflecting surface being arranged to be perpendicular to the light incident surface and to define an angle of 45° with respect to the light emission surface.

5. A polarizer according to claim 4, wherein light is made incident upon the light incident surface at right angles.

6. A polarizer according to claim 4, wherein the polarizer is comprised of a first prism provided with the light incident surface, the polarization beam splitting surface, the second reflecting surface, and an emission surface portion which defines a part of the light emission surface, and a second prism which is provided with the polarization beam splitting surface, the first reflecting surface, and an emission surface portion which defines a part of the light emission surface, said first and second prisms being cemented at their respective polarization beam splitting surfaces.

7. A polarizer comprising:

a prism having orthogonal light incident and light emission surfaces;

a polarization beam splitting surface which defines an angle of 45° with respect to the light incident surface and which is perpendicular to the light emission surface to split the light incident upon the light incident surface into two linearly polarized light components;

a first reflecting surface which defines an angle of 45° with respect to the light incident surface and the light emission surface and which internally reflects the light component transmitted through the polarization beam splitting surface toward the light emission surface; and a second reflecting surface which is perpendicular to the light incident surface and which defines an angle of 45° with respect to the light emission surface to internally reflect the light component reflected by the polarization beam splitting surface towards the light emission surface;

wherein said first and second reflecting surfaces and said polarization beam splitting surface are arranged to meet at a line which defines an edge of the prism.

8. A method for using a polarizer according to claim 7, wherein light is made incident upon the light incident surface at right angles.

9. A polarizer according to claim 7, wherein the prism is in the form of a pyramid having a square bottom surface, whose apex is located on a line normal to the bottom surface at one of the four corner points thereof, the height of the pyramid being identical to the length of one side of the square, and wherein one of the side surfaces of the pyramid which are in the form of right-angled isosceles triangles defines the light incident surface, and said square bottom surface defines the light emission surface.

10. A polarizer according to claim 7, wherein an unnecessary portion of the prism through which no light passes is cut away.

11. A polarizer according to claim 7, further comprising deflecting prisms adhered to said light emission surface of said prism.

12. A polarizer according to claim 7, wherein said prism is comprised of two polarizers, respectively having second reflecting surfaces adhered thereto.

13. A polarizer in which light is incident upon a polarization beam splitting surface to split the light into a light component transmitted therethrough and a light component reflected by the polarization beam splitting surface, both the light components are reflected by respective reflecting surfaces, wherein the polarizer comprises:

first and second reflecting surfaces which define an angle of 120° therebetween; and a beam splitting surface which lies in a bisectional plane of the first and second reflecting surfaces, said first and second reflecting surfaces and said polarization beam splitting surfaces being arranged to meet at a line which defines an edge of the polarizer;

wherein said first and second reflecting surfaces and said polarization beam splitting surface are positioned such that light parallel to said second reflecting surface is incident on said polarization beam splitting surface at an angle of 45°.

14. A polarizer comprising:

a prism having orthogonal light incident and light emission surfaces;

a polarization beam splitting surface which defines an angle of 45° with respect to the light incident surface and which is perpendicular to the light emission surface to split the light incident upon the light incident surface into two linearly polarized light components;

a first reflecting surface which defines an angle of 45° with respect to the light incident surface and the light emission surface and which internally reflects the light component transmitted through the polarization beam splitting surface toward the light emission surface; and a second reflecting surface which is perpendicular to the light incident surface and which defines an angle of 45° with respect to the light emission surface to internally reflect the light component reflected by the polarization beam splitting surface toward the light emission surface;

wherein the polarization beam splitting surface separates the incident light into a P-polarization element and an S-polarization element.

* * * * *